United States Patent
Slupphaug et al.

(10) Patent No.: US 8,380,475 B2
(45) Date of Patent: Feb. 19, 2013

(54) METHOD FOR PREDICTION IN AN OIL/GAS PRODUCTION SYSTEM

(75) Inventors: Olav Slupphaug, Oslo (NO); Steinar Elgsaeter, Trondheim (NO)

(73) Assignee: ABB AS (NO)

( * ) Notice: Subject to any disclaimer, the term of this patent is extended or adjusted under 35 U.S.C. 154(b) by 417 days.

(21) Appl. No.: 12/714,971

(22) Filed: Mar. 1, 2010

(65) Prior Publication Data
US 2010/0174517 A1    Jul. 8, 2010

Related U.S. Application Data

(63) Continuation of application No. PCT/EP2008/061787, filed on Sep. 5, 2008.

(60) Provisional application No. 60/935,945, filed on Sep. 7, 2007.

(30) Foreign Application Priority Data

Sep. 7, 2007 (NO) .................................. 20074557

(51) Int. Cl.
*G06F 17/50*   (2006.01)
(52) U.S. Cl. ................. 703/10; 703/2; 435/13; 209/208
(58) Field of Classification Search .................. 703/10; 435/13; 209/208
See application file for complete search history.

(56) References Cited

U.S. PATENT DOCUMENTS

| | | | |
|---|---|---|---|
| 2007/0016389 A1 | 1/2007 | Ozgen | |
| 2009/0014360 A1* | 1/2009 | Toner et al. | 209/208 |
| 2010/0174517 A1* | 7/2010 | Slupphaug et al. | 703/10 |
| 2010/0267065 A1* | 10/2010 | Geiger et al. | 435/13 |

FOREIGN PATENT DOCUMENTS

| | | |
|---|---|---|
| WO | 0162603 A2 | 8/2001 |
| WO | 2006003118 A1 | 1/2006 |
| WO | 2006048418 A1 | 5/2006 |

OTHER PUBLICATIONS

Efron, B and Tibshirani, R. (1993) An introduction to the Bootstrap, Champan & Hall; entire book (pp. 1-456).
Diab, A., Griess, B. and Shulze-Riegert, R. (2006), "Application of global optimization techniques for model validation and prediction scenarios of a north African oil field"; in 'SPE Europec/EAGE Annual Conference and Exhibition' (SPE 1001093); 11 pages.
Wang (2003); "Development and application of production optimization for petroleum fields"; 196 pages.
International Search Report and Written Opinion of the International Searching Authority; PCT/EP2008/061787; Apr. 17, 2009; 8 pages.

(Continued)

*Primary Examiner* — Thai Phan
(74) *Attorney, Agent, or Firm* — St. Onge Steward Johnston & Reens LLC

(57) ABSTRACT

Method in an oil and/or a gas production system including a plurality of oil and/or gas wells each producing a multiphase fluid stream, adapted for predicting change in produced fluids resulting from change in manipulated variables. Fitted model parameters which express the relationship between the change in manipulated variables and the produced fluids are determined from a set of historical production measurements. The method includes the steps of choosing a model structure which predicts change in produced fluids as a function of the change in manipulated variables, where the predicted change in produced fluids depends on the value of fitted model parameters, determining fitted model parameters so that predictions of produced fluids match said historical production measurements as closely as possible, and determining a quality tag that describes the uncertainty of the predictions of change in produced fluids.

25 Claims, 4 Drawing Sheets

OTHER PUBLICATIONS

Sjöberg, J. and Zhang, Q. and Ljung, L. and Benveniste, A. and Delyon, B. and Glorennec, P.-Y. and Hjalmarsson, H. and Juditsky, A. (1995); "Nonlinear black-box modelling in system identification: a unified overview"; in Automatica, vol. 31, p. 1691-1724.

Norwegian Search Report; Application No. 20074557; Mar. 27, 2008; 1 page.

Zangl, G., Graf, T. and Al-Kinani, A. (2006) "Proxy modeling in production optimization" in 'SPE Europec/EAGE Annual Conference and Exhibition' (SPE 100131); 7 pages.

Costa, A., Schiozer, D. and Poletto, C. (2006), "Use of uncertainty analysis to improve production history matching and the decision-making process"; in 'SPE Europec/EAGE Annual Conference and Exhibition' (SPE 99324); 6 pages.

\* cited by examiner

METHOD FOR PREDICTION IN AN OIL/GAS PRODUCTION SYSTEM

CROSS-REFERENCE TO RELATED APPLICATIONS

The present application is a continuation of pending International patent application PCT/EP2008/061787 filed on Sep. 5, 2008, which designates the United States and claims priority from Norwegian patent application number 20074557 filed on Sep. 7, 2007, and claims the benefit under 35 U.S.C. §119(e) of the U.S. Provisional Patent Application Ser. No. 60/935,945 filed on Sep. 7, 2007. All prior applications are herein incorporated by reference in their entirety.

FIELD OF THE INVENTION

The present invention relates to a method in an oil and/or a gas production system comprising a plurality of oil and/or gas wells each producing a multiphase fluid stream, adapted for predicting change in produced fluids resulting from change in manipulated variables. The present invention also relates to a computer program product for executing one or more steps according to the method, and a system for an oil and/or a gas production in correspondence with the method.

BACKGROUND OF THE INVENTION

Production throughput is an important performance indicator in an oil and/or a gas production system. Herein, production throughput is intended to mean the oil and/or water and/or gas production per time interval. The throughput depends on many different factors; some may be specific to each production system, others are more general. One important general factor is how the limited processing capacity of the production system is utilized.

Manipulated variables in the production system may be settings related to routing, production valves or gas lift valves, and these manipulated variables should be chosen such that throughput is maximized while processing capacities are not over-utilized.

By using computer simulation or a mathematical optimization method, good values of manipulated variables may be found. The accuracy of the computer simulations and mathematical optimization methods depend on the accuracy of the parameters used in their mathematical model. To ensure good accuracy of the simulation, parameters of the mathematical model are normally determined through experiments.

Experiments on wells are generally performed by routing an individual well to a dedicated test separator. The oil, water and/or gas rates at the outlet of the separator are then measured. A test may take several hours, constraining the frequency at which wells can be tested. Oftentimes, production is only measured for a single value of manipulated variables; production may for instance be measured for the current production valve opening, a single-rate well test. During a multi-rate well test, multiple values of manipulated variables are tested for a single well, for instance by measuring production for multiple production valve openings. As production may require a time to settle once manipulated variables are changed, multi-rate well tests require a well to be routed to a test separator for a longer duration and may therefore be more costly. As the production system may already be producing at the constraints of its processing capacities, care must be taken not to exceed these constraints when a multi-rate well test is performed, so that multi-rate well tests have a risk and a possible cost related to temporary reduction in throughput.

For an oil and/or a gas system a well test is typically performed by routing the production from a single well (one of several wells in the system), 105, 106 or 127 (see FIG. 1) to a dedicated test separator 107. This allows for measuring of parameters related to this single (specific) well. The values measured are typically the flow rates of oil, water and gas, as well as test separator pressure and/or temperature, up- and downstream wellhead pressure and temperature, and choke opening. There is typically only one or a few such test separator(s) 107 in each production system. Therefore, all wells in the system cannot continuously be monitored.

The currently used method for predicting throughput in oil and/or gas production system as manipulated variables are changed is to use commercial simulators, see for instance Wang (2003) "Development and application of production optimization for petroleum fields". To increase simulator accuracy, commercial simulators are often fitted to single- and/or multi-rate well tests. Often, predictions of production found by commercial simulators for varying values of manipulated variables are collected in tables, so called proxy-models, and these proxy-models are fitted to production data rather than fitting commercial simulators directly, see for instance Zangl, G., Graf, T. and Al-Kinani, A. (2006) "Proxy modeling in production optimization" in 'SPE Europec/EAGE Annual Conference and Exhibition' (SPE 100131).

A drawback of predictions based on commercial simulators either directly or through proxy-models, is that some error in the ability of the model to predict responses in production to changes in manipulated variables must be expected due to the complexity of modeling multiphase flows. This shortcoming could be mitigated by regularly performing multi-rate well tests for all wells and fitting models to these tests. The cost in terms of increased risk for complete or partial shut downs and/or temporarily reduced throughput of performing multi-rate well tests means that this is usually not a viable option. Fitting models to single-rate well tests may also improve model predictions somewhat, but single-rate well tests do not reveal information on the response of production to change in manipulated variables.

An international patent application WO2006/048418 entitled "Method and system for production metering of oil wells", discloses a method and system for the metering of oil wells. According to the method a series of well tests is performed initially, during which manipulated variables of a tested well are varied and measured variation in production is used to determine a dynamic fingerprint. During the series of well tests, the manipulated variables of one well are varied, while the production from other wells is maintained substantially constant or interrupted. Weights are found iteratively so that measured total production rates are close to a weighted sum of dynamic fingerprints. The resulting metering system is intended for determining current production given current production measurements.

Methods for fitting reservoir models to production data, usually from normal operation, are referred to as history matching. Costa, A., Schiozer, D. and Poletto, C. (2006), "Use of uncertainty analysis to improve production history matching and the decision-making process" in 'SPE Europec/EAGE Annual Conference and Exhibition'(SPE 99324), discusses how geological uncertainties can be quantified in history matching to determine the risk curve when predicting future reservoir performance. The authors suggested defining uncertainties in geological parameters from experience, before fitting models to historical production data for a variety of different values of uncertainty geological parameters and simulating with each model to determine the significance of said uncertainty on predictions of future production. Diab, A., Griess, B. and Shulze-Riegert, R. (2006), "Application of global optimization techniques for model validation and prediction scenarios of a north African oil field" in 'SPE Europec/EAGE Annual Conference and Exhibition' (SPE 1001093) discusses the use of the Multipurpose Environment for Parallel Optimization (MEPO). The authors discuss a scheme to perform multiple history matches using different optimization algorithms to obtain multiple estimates of model parameters in dynamic reservoir models.

Reservoir models are designed to describe the geological properties and states of a reservoir, emphasis is not on describing oil and/or gas production system and the relationship between production and manipulated variables. Reservoir models are used to determine strategies for injection of water and/or gas at injection wells in the reservoir, for aiding decisions related to field development such as installing new equipment or wells, or for making predictions on future trends in production on the timescale of months and years. Reservoir models are often large and complex and may require days to solve and are labor-intensive to maintain due to their complexity.

On the timescale of hours and days, the effects of change in geological properties and states or responses to change in injection will be barely noticeable on throughput in an oil and/or a gas production system. Throughput can be varied in a matter of minutes by altering manipulated variables related to gas lift, production valve or routing settings. Reservoir models will not be suited for maximizing throughput on these timescales, as any conclusions found by simulating reservoir models may be outdated by the time simulations are complete, and due to their complexity it may be difficult for reservoir models to predict changes in throughput correctly as manipulated variables change.

Performing a series of well tests may have a cost, as it may mean that throughput is not at its maximum during the tests. Instead of exploiting a series of well tests, it is conceivable to exploit historical measurements of normal operations, the difficulty of this alternate approach is that some manipulated variables may have been varied simultaneously and others may have been varied little or not at all. The quality of predicted throughput derived from historical measurements of production during normal operations may thus vary.

SUMMARY OF THE INVENTION

A general object of the present invention is to provide a method and system to predict how changes in manipulated variables will affect throughput in an oil and/or a gas production system.

Another object of the present invention is to provide a method and system to exploit historical production measurements which describe normal operations.

To be easily maintainable, the invention preferably exploits information in recent historical measurements in the oil/gas production system to predict how throughput varies with manipulated variables.

These and other objects are achieved by a method and a corresponding system according to the present invention, having the features defined in the independent claims.

Preferred embodiments are set forth in the dependent claims.

The inventive method in an oil and/or a gas production system comprises a plurality of oil and/or gas wells each producing a multiphase fluid stream, is adapted for predicting change in produced fluids resulting from change in manipulated variables. Fitted model parameters which express the relationship between the change in manipulated variables and the produced fluids are determined from a set of historical production measurements. The method comprising the steps of a. choosing a model structure which predicts change in produced fluids as a function of the change in manipulated variables, where the predicted change in produced fluids depends on the value of fitted model parameters
b. determining fitted model parameters so that predictions of produced fluids match said historical production measurements as closely as possible, such that the discrepancy between predictions of produced fluids and said historical production measurements is minimized
c. determining a quality tag that describes the uncertainty of said predictions of change in produced fluids.

The quality tag for the predictions of produced fluids is preferably determined by quantifying what range of fitted model parameter values give equivalent matches to the set of historical production measurements. Thus, a quality tag is preferably estimated to determine the expected accuracy of predictions by determining what range of parameters describe the set of historical measured production equally well, preferably by bootstrapping Instead of requiring a series of designed experiments in the form of e.g. multi-rate well tests for each well as disclosed in the prior art, the inventive method is preferably designed to exploit variation observed during normal operations. To account for the fact that historical data may be less informative than designed experiments, a quality tag is associated with predictions made for each rate. This quality information may be used to support decisions on which wells to test in order to reduce the uncertainty if found significant.

The fitted model parameters are preferably used to determine values of manipulated variables which increase throughput either during normal operation or start-up.

At least one quality tag is preferably used to determine values of manipulated variables which increase throughput.

The fitted model parameters are preferably determined through statistical regression analysis or through dynamic system identification.

The description of uncertainty of fitted model parameters is preferably determined through bootstrapping.

Preferably at least one fitted model parameter describes measurement uncertainty. Thus, measurement uncertainties may be determined in addition to fitted model parameter uncertainty.

Preferably, the model structure in addition to fitted model parameters depends on model parameters which are fixed.

The model structure is preferably based on physical modeling, black-box modeling, or a combination thereof.

The historical production measurements preferably include measurements of manipulated variables that influence routing valves, gas lift valves or production valves in the production system.

The model structure is preferably used to determine the present production of individual wells.

The description of uncertainty is preferably used to reduce or compensate for uncertainty in fitted model parameters.

Preferably, the set of historical production measurements can describe normal operations, where some manipulated variables are changed little and where other manipulated variables are altered simultaneously and may include single- or multi-rate well tests or multiphase rate measurements where available.

The historical production measurements preferably include measurements from a test separator or include measurements from a multiphase meter.

The historical production measurements preferably include measurements of separated produced fluids from one or several wells, such as the total separated production of oil, gas or water.

Preferably, a reference to at least one of prediction of produced fluids, quality tag or fitted model parameter, is presented to a user or an operator.

The fluid streams produced by the individual wells are preferably comingled and routed via a fluid separation assembly.

Further advantages as well as advantageous features of the present invention will appear from the following description and the appended claims.

BRIEF DESCRIPTION OF THE DRAWINGS

The accompanying drawings illustrate the present invention by way of examples and, together with the following description, further serve to explain the principles of the invention and to enable a person skilled in the pertinent art to use the invention.

DETAILED DESCRIPTION OF THE INVENTION

Figure 1:
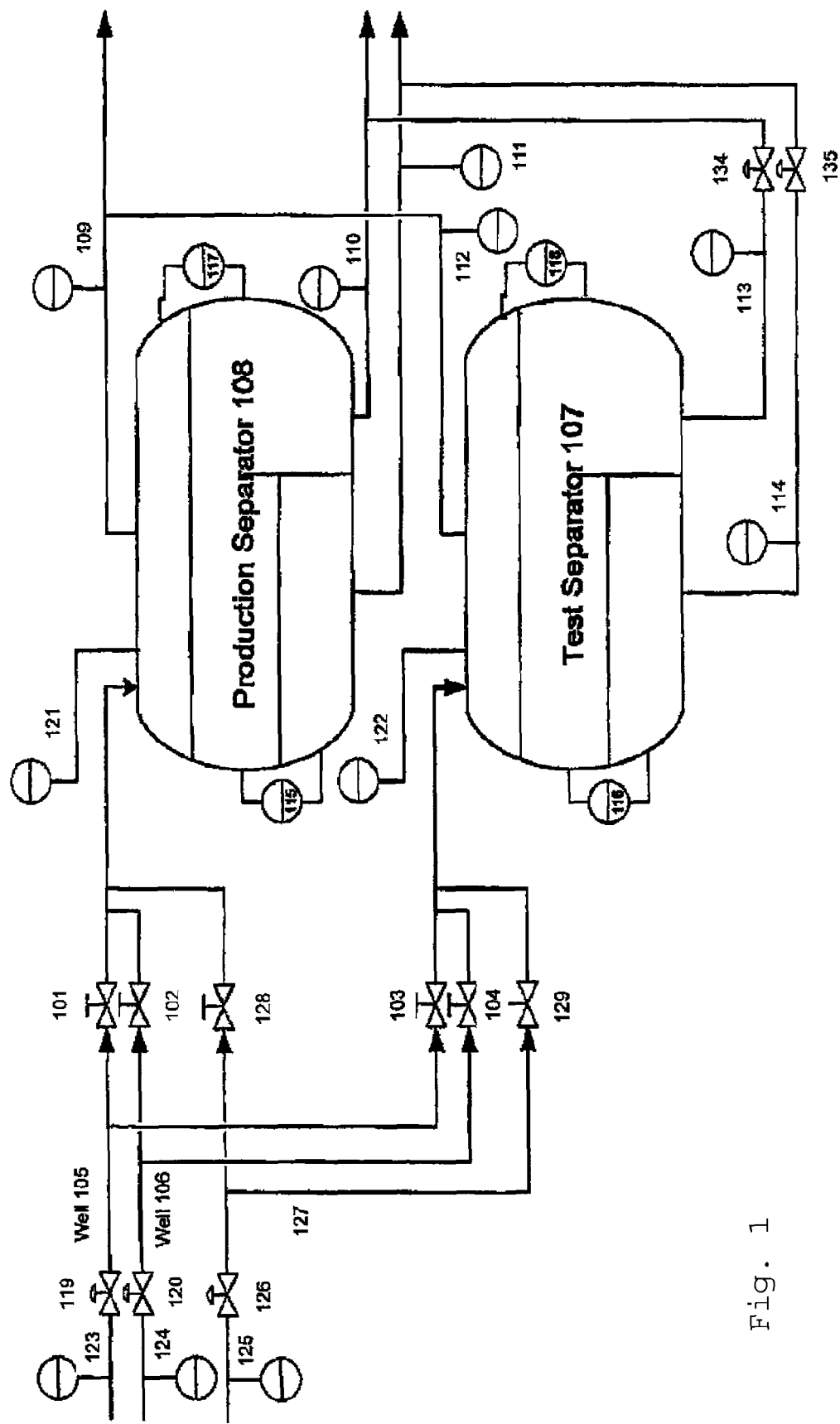
FIG. 1 is a schematic drawing of an oil and/or a gas production system where an embodiment of the present invention is applied.

In FIG. 1 is shown a schematic drawing of an oil and or gas production system where the present invention may be applied.

The system comprises three wells 105, 106, 127, a production separator 108 and a test separator 107. The invention may naturally be also used in systems comprising two wells, or more than three wells.

123 designates an upstream valve pressure of a valve 119 of a well 105; 124 designates an upstream valve pressure of a valve 120 of a well 106, and 125 designates an upstream valve pressure of a valve 126 for well 127. The term valve should herein be understood in a broad sense, i.e. to include a choke, a gate valve, a routing valve or a control valve.

101, 102, 128 designate routing valves for production separator 108 for the wells 105, 106 and 127, respectively.

103, 104 and 129 designate routing valves for test separator 107 for the wells 105, 106 and 127, respectively.

109 designates a flow rate measurement device for gas of production separator 108; 110 designates a flow rate measurement device for oil of production separator 108; and 111 designates a flow rate measurement device for water of production separator 108. 115 designates a water level measurement device for production separator 108. 117 designates an oil level measurement device for production separator 108; and 121 designates a gas pressure measurement device for production separator 108.

112 designates a flow rate measurement device for gas of test separator 107; 113 designates a flow rate measurement device for oil of test separator 107; 114 designates a flow rate measurement device for water of test separator 107;

116 designates a water level measurement device test separator 107; 118 designates an oil level measurement device for gas of test separator 107; and 122 designates a gas pressure measurement device for test separator 107.

All measurements may be recorded in a data storage for later use.

Figure 2:
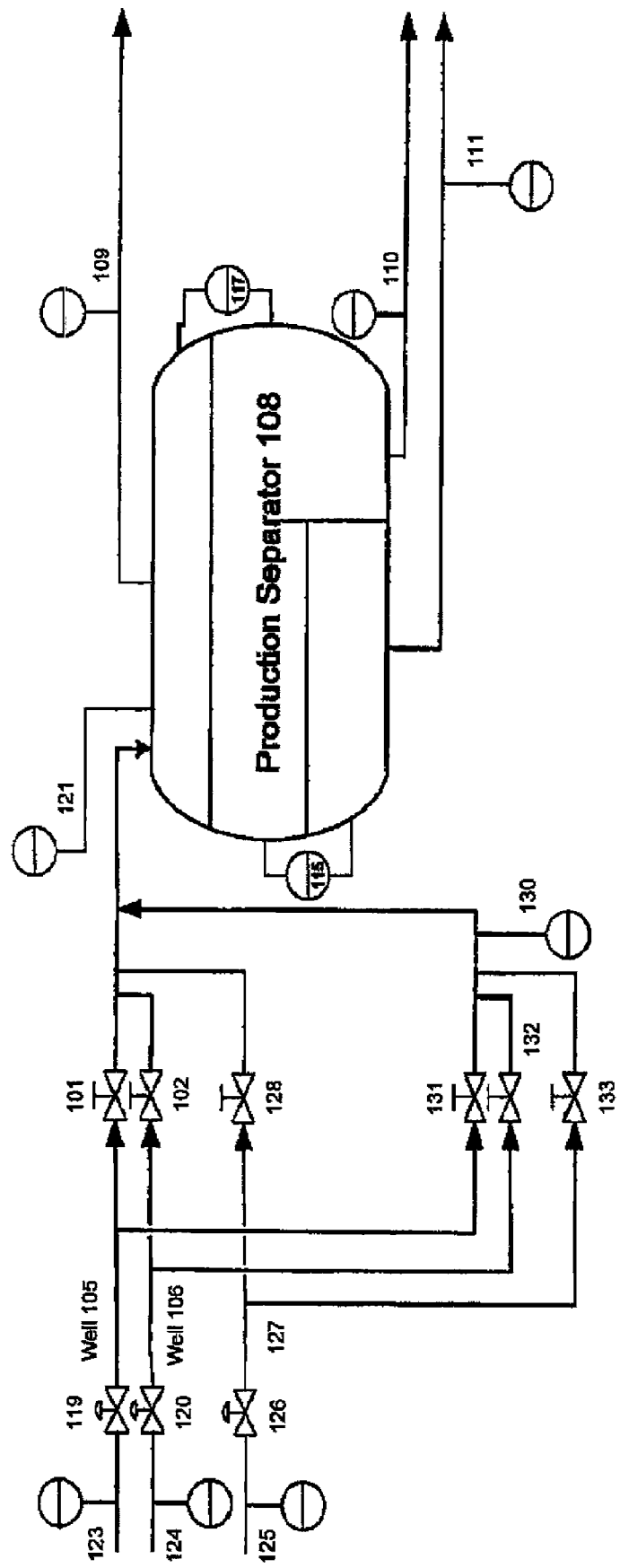
FIG. 2 is a schematic drawing of an oil and/or a gas production system where an alternative embodiment of the present invention is applied.

FIG. 2 is a schematic drawing of an oil and/or a gas production system where an alternative embodiment of the present invention is applied. According to this alternative implementation, the test separator 107 is replaced by a multiphase flow measurement device 130. After the stream has been measured, it is routed to the production separator 108. In FIG. 2, 130 designates a multiphase flow-rate measurement device. 131, 132 and 133 designate routing valves for the multiphase flow measurement device for wells 105, 106 and 127, respectively. The invention may naturally also be used in systems comprising two wells, or more than three wells. All other items in FIG. 2 are described above in connection with FIG. 1.

Figure 3:
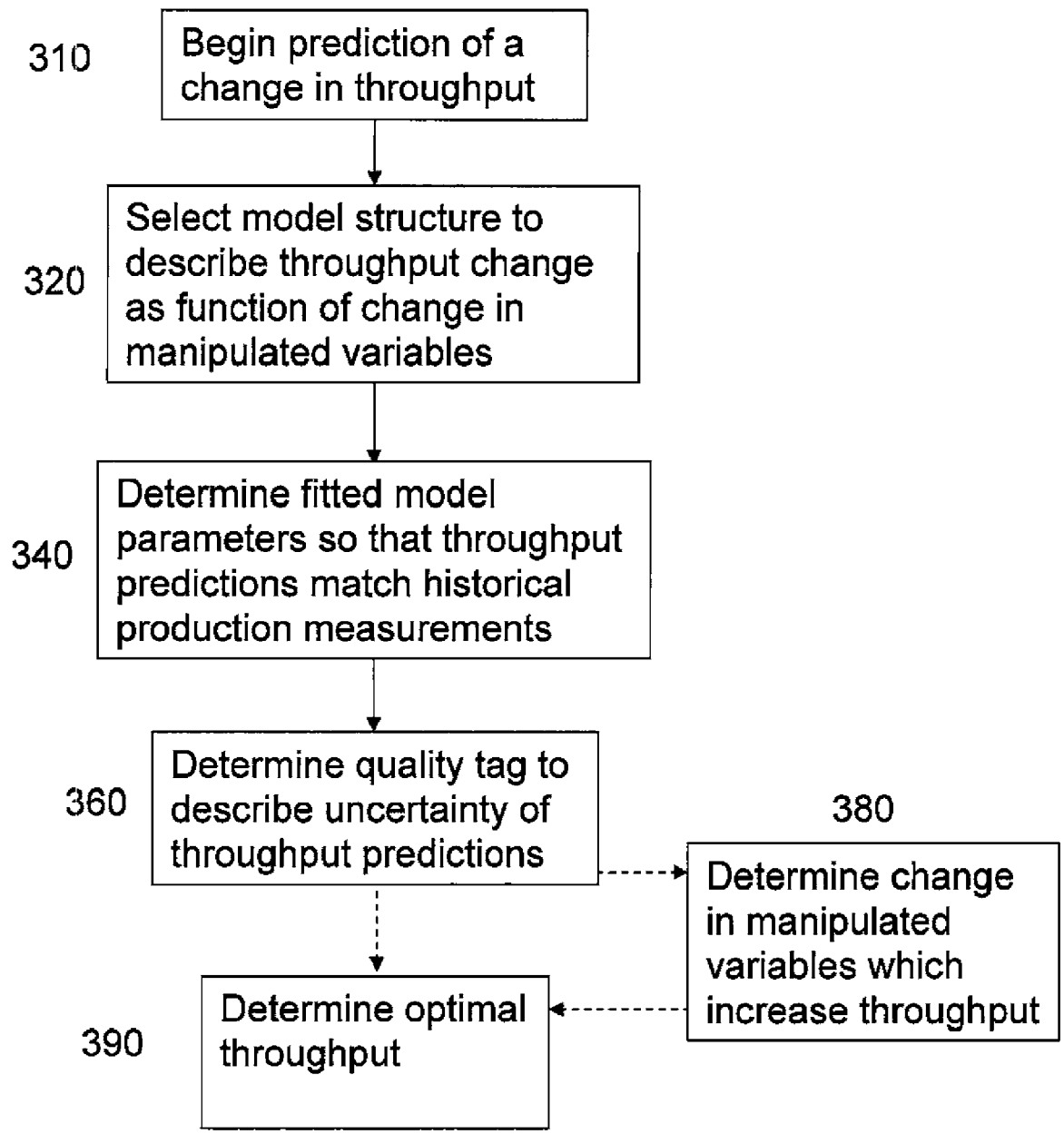
FIG. 3 is a flow chart for a method for predicting a throughput of an oil and/or a gas production system dependent on change in manipulated variables according to an embodiment of the invention.
Figure 4:
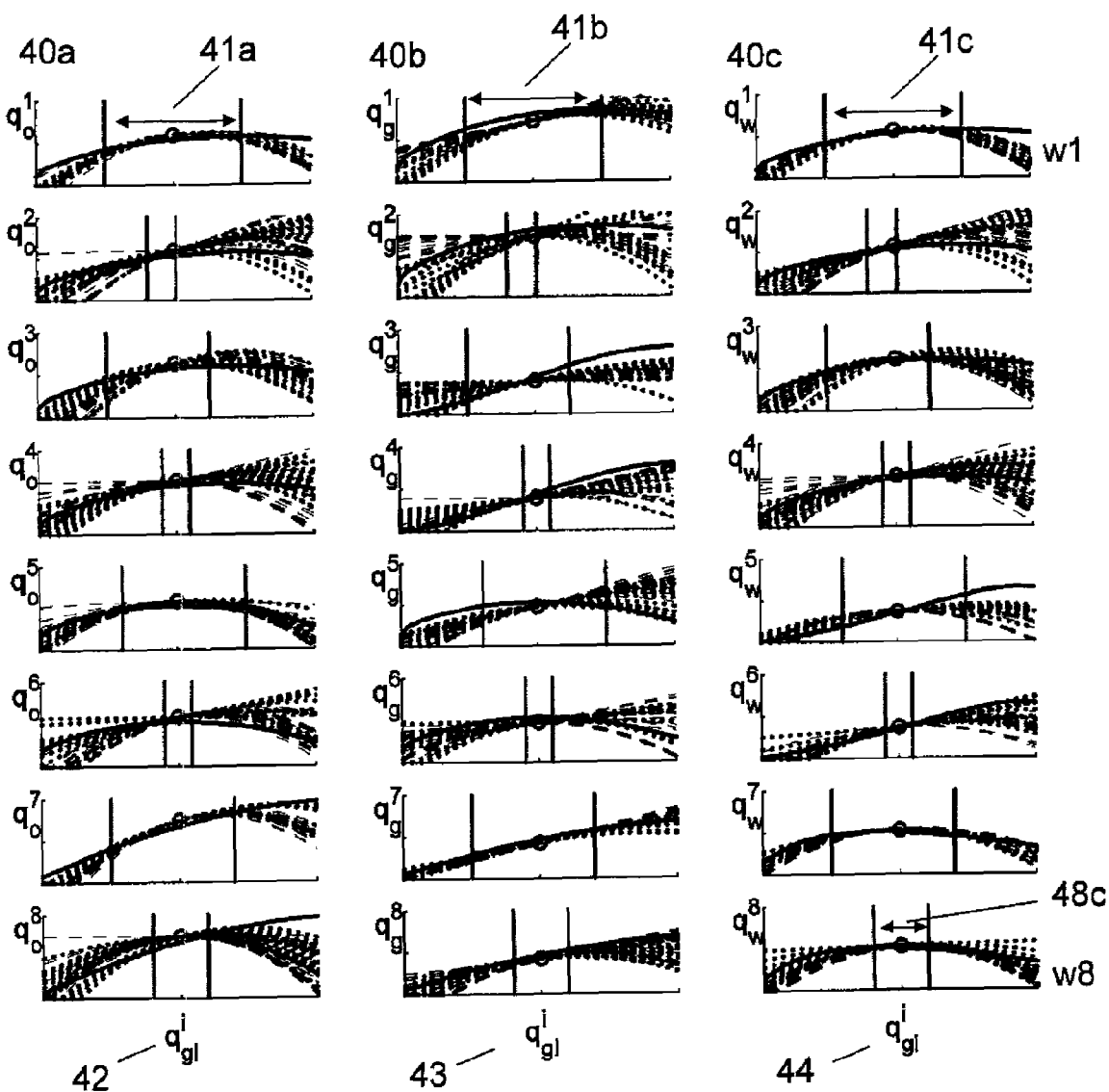
FIG. 4 is an illustration of production models and quality tags for a plurality of wells according to an embodiment of the invention.

FIG. 3 is a flowchart for a method for predicting a throughput of an oil and/or a gas production system dependent on change in manipulated variables according to an embodiment of the present invention. The figure shows a number of steps:
  310. Begin prediction of a change in throughput
  320. Select a model structure to describe throughput change as function of change in manipulated variables
  340. Determine fitted model parameters so that the prediction match historical production measurements closely or as close as possible
  360. Determine quality tag to describe uncertainty of throughput predictions
  380. Optionally—Determine change in manipulated variables which increase throughput
  390. Optionally—Determine optimal throughput FIG. 4 is an illustration of a preferred embodiment of production models and quality tags in which the chosen model structure may comprise one or more expressions according to the following:

$$\hat{q}_o^i = \max\{0, z^i q_o^{l,i}(1 + a_o^u \Delta q_{gl}^i + \kappa_o^i (\Delta q_{gl}^i)^2)\}$$

$$\hat{q}_g^i = \max\{0, z^i q_g^{l,i}(1 + a_g^u \Delta q_{gl}^i + \kappa_g^i (\Delta q_{gl}^i)^2)\}$$

$$\hat{q}_w^i = \max\{0, z^i q_w^{l,i}(1 + a_w^u \Delta q_{gl}^i + \kappa_w^i (\Delta q_{gl}^i)^2)\}$$

where hat $q_o^i$ is estimated oil, hat $q_g^i$ is estimated gas and hat $q_w^i$ is estimated water flow rates of well i for a field with a plurality of wells, and $q_{gl}^i$ is gaslift flow rates of well i, which are the variables to be manipulated in this case. $\alpha_o^i$, $\alpha_g^i$, $\alpha_w^i$ and $\kappa_o^i$, $k_g$, $k_w^i$ for all wells i are fitted model parameters. In this case $z^i$ represents production valve opening of well i and $q_o^{l,i}$, $q_g^{l,i}$ and $q_w^{l,i}$ represents local operating points of the model. $q_o^{l,i}$, $q_g^{l,i}$ and $q_w^{l,i}$ are measured rates of oil, gas and water which are determined in this case from the most recent well test for each well.

The diagrams in FIG. 4 show predictions of oil flow rates 40a, gas flow rates 40b and water flow rates 40c for eight wells, w1 to w8, when fitted to a set of historical production data using statistical regression and bootstrapping. Predictions are shown for different values of gas lift rates $q_{g1}^i$ 42, 43 and 44. Local operating points $q_o^{l,i}$, $q_g^{l,i}$ and $q_w^{l,i}$ are shown as circles in FIG. 4. Solid vertical lines illustrate the span of gas lift rates observed in the tuning set for each well, for the first well w1, 41a, 41b and 41c indicate the span of manipulated variables observed in the tuning set. The solid lines in FIG. 4 illustrate the actual response of the field to changes in $q_{gl}$, which would be unknown when implementing the method on field data. The different dashed lines represent predictions with different values of the fitted model parameters, and all these alternative fitted model parameters gave equivalent matches, or in other words within acceptable limits, between predictions and a set of historical production measurements. The set of different fitted model parameters represent a quality tag.

The inventive method in an oil and/or a gas production system comprises a plurality of oil and/or gas wells each producing a multiphase fluid stream, adapted for predicting change in produced fluids resulting from change in manipulated variables. Fitted model parameters which express the relationship between the change in manipulated variables and the produced fluids are determined from a set of historical production measurements, measurements of manipulated variables and measurements of production spanning a time interval. The method comprises the steps of:

a. choosing a model structure which predicts change in produced fluids as a function of the change in manipulated variables, where the predicted change in produced fluids depends on the value of fitted model parameters;
b. determining fitted model parameters so that predictions of produced fluids match said historical production measurements as closely as possible or within acceptable limit, such that the discrepancy between predictions of produced fluids and said historical production measurements is minimized;
c. determining a quality tag that describes the uncertainty of said predictions of change in produced fluids.

The method relates to predicting production, while determining a quality tag for predictions of produced fluids which expresses uncertainty. This quality tag for predictions may be determined by quantifying what range of parameter values give essentially equivalent matches to the set of historical production measurements.

A model structure is chosen based on physical modeling, black-box modeling, or a combination thereof. Some parameters are fitted, in addition some parameters may be fixed and some parameters may express measurement uncertainty. The model structure should be capable of predicting change in production as manipulated variables influencing routing valves, gas lift valves or production valves in the production system change. Predictions should depend on the value of fitted parameters.

Parameters are fitted through statistical regression analysis or dynamic system identification, exploiting a set of historical production measurements. The set of historical production measurements can describe normal operations, where some manipulated variables are changed little and where other manipulated variables are altered simultaneously. The uncertainty in these parameters can be obtained through bootstrapping.

In a preferred embodiment, the invention may be used to determine values of manipulated variables which maximize throughput.

In addition the method relates to using said model to determine the present production of an individual well, and using the description of uncertainty to reduce or compensate for uncertainty in parameters.

The model may be fitted to measurements performed using a test separator 107. Alternatively or in addition, the model may be fitted to a multiphase flow measurement device 130. The model may also be fitted to other measurements, for instance measured fiscal production rates.

The method may include presenting a reference to at least one of prediction of produced fluids, quality tag or fitted model parameter, to a user or an operator.

The present invention also relates to a computer program loadable into the internal memory of a processing unit in a computer based system comprising a memory storage device, comprising the software code portions for performing one or more of the steps according to the inventive method, when the computer program product is run on said system. In addition the invention relates to a computer program product stored on a computer readable medium, comprising software code portions or a computer program for causing a processing unit in a computer based system, to control an execution of one or more of the steps according to the inventive method.

Thus, the method according to the present invention may be implemented as software, hardware, or a combination thereof. A computer program product implementing the method or a part thereof comprises software or computer program, run on a general purpose or specially adapted computer, processor or microprocessor. The software includes computer program code elements or software code portions that make the computer perform the method using at least one of the steps according to the inventive method.

The program may be stored in whole or part, on, or in, one or more suitable computer readable media or data storage means such as a magnetic disk, CD-ROM or DVD disc, hard drive, magneto-optical memory storage means, in RAM or volatile memory, in ROM or flash memory, as firmware, or on a data server.

In the following the method steps according to the present invention are described in more detail by way of examples.

Choosing a Model Structure

Let u be a vector of manipulated variables, let d be a vector of disturbances and θ be a vector of fitted parameters, and let y be a vector of measurements of production.

Let f be a vector which expresses the production of each modeled fluid produced from each modeled well. In a preferred embodiment, f may be a vector of the oil, gas and water production of each well. The production model is then any model on the form $$0 = f(x, u, d, \hat{\theta})$$

The production model may also include parameters which are not fitted, for instance physical parameters whose value are assumed known. Fitted parameters may for example express unknown physical quantities or measurement uncertainties to be determined.

In a preferred embodiment, production is related to routing by a matrix R so that $$\bar{y}[t] \stackrel{\Delta}{=} R[t]x[t]$$

Predictions of measured values are related to the production model by $$\hat{y}_{\hat{\theta}}[t] \stackrel{\Delta}{=} R[t]\hat{x}(\hat{\theta})[t] + \hat{\beta}_y,$$

where beta y is a vector of measurement biases.

The choice of model structure is a design choice. f may be determined through physical modeling, either so-called white-box or so-called grey-box modeling, or f can be chosen as a relatively general model structure which expresses no prior physical knowledge, so called black-box modeling.

Combinations of these approaches are also possible. Details on considerations when choosing model structure are found in Sjöberg, J. and Zhang, Q. and Ljung, L. and Benveniste, A. and Delyon, B. and Glorennec, P.-Y. and Hjalmarsson, H. and Juditsky, A. (1995) "Nonlinear black-box modelling in system identification: a unified overview" in Automatica, vol 31, page 1691-1724.

It is preferred that estimates ŷ as u changes can be influenced by the choice of θ, and that f has a structure that is concurrent with physical understanding of the relationship between manipulated variables and production. In a preferred embodiment, f may be a static nonlinearity and θ may include one parameter for the gradient and one parameter for the curvature between some manipulated variable for each well and the resulting production of that well.

Fitting Parameters

In a preferred embodiment, the parameter vector θ may be determined numerically by a numerical optimization algorithm, for instance fmincon in MatLab solving a parameter estimation problem.

$$\hat{\theta} = \arg\min_{\theta} V(\theta, Z^N) + V_s(\theta)$$
$$\text{s.t. } c_\theta(\theta) \le 0.$$

The parameters are determined so that some measure of fit $V(\theta, Z^N)$ is minimized, in addition to minimizing soft constraints $V_s(\theta)$ and obeying constraints $c_\theta(\theta)$.

The set of historical production data is $$Z^N = [\bar{y}[1] \; \bar{d}[1] \; \bar{u}[1] \; \bar{y}[2] \; \bar{d}[2] \; \bar{u}[2] \ldots \bar{y}[N] \; \bar{d}[N] \; \bar{u}[N]].$$

In a preferred embodiment V is $$\sum_{t=1}^{N} w(t) \|\epsilon(t)\|_2^2$$

Where $$\epsilon[t] = \bar{y}[t] - \hat{y}[t] \; \forall t \in \{1, \ldots, N\}.$$

are residuals.

In a preferred embodiment $V_s(\theta)$ may be a regularization term which penalizes deviation in θ from known values when available. In a preferred embodiment $c_\theta(\theta)$ may express sign constraints on θ when available.

Determine a Quality Tag

A quality tag may be determined by determining alternative parameters θ which express the set of historical production data equally well as the solution to the original parameter estimation problem. In a preferred embodiment, this quality tag is found by generating a set of synthetic data sets which are qualitatively similar to the original data set and generating parameter estimates for each of these data sets in a manner similar to the original parameters. In a preferred embodiment, this method may be carried out by means of bootstrapping, as is described in Efron, B and Tibshirani, R. (1993) *An introduction to the Bootstrap*, Champan & Hall.

Determine Optimal Throughput

In a preferred embodiment the method is used to determine changes in manipulated variables which increase throughput and/or profit. In a preferred embodiment this change in manipulated variable is determined by solving a numerical optimization problem $$[\hat{u}(\hat{\theta}) \hat{x}(\hat{\theta})] = \arg\max_{u,x} M(x, u, d)$$
$$\text{s.t } 0 = f(x, u, d, \hat{\theta})$$
$$0 \le c(x, u, d).$$

where M(x,u,d) is some measure of profit and/or throughput and c expresses production constraints.

The present invention is not limited to the above-described preferred embodiments. Various alternatives, modifications and equivalents may be used. Therefore, the above embodiments should not be taken as limiting the scope of the invention which is defined by the appending claims.

What is claimed is:

1. A method in an oil and/or a gas production system comprising a plurality of oil and/or gas wells each producing a multiphase fluid stream, adapted for predicting change in produced fluids resulting from change in manipulated variables, characterized in that fitted model parameters which express the relationship between the change in manipulated variables and the produced fluids are determined from a set of historical production measurements, said method comprising the steps of
   a. choosing a model structure which predicts change in produced fluids as a function of the change in manipulated variables, where the predicted change in produced fluids depends on the value of fitted model parameters
   b. determining fitted model parameters so that predictions of produced fluids match said historical production measurements as closely as possible
   c. determining a quality tag that describes the uncertainty of said predictions of change in produced fluids.

2. Method according to claim 1, wherein the quality tag for the predictions of produced fluids is determined by quantifying what range of fitted model parameter values give equivalent matches to the set of historical production measurements.

3. Method according to claim 1, wherein the fitted model parameters are used to determine values of manipulated variables which increase throughput.

4. Method according to claim 3, wherein at least one quality tag is used to determine values of manipulated variables which increase throughput.

5. Method according to claim 1, wherein fitted model parameters are determined through statistical regression analysis.

6. Method according to claim 1, wherein fitted model parameters are determined through dynamic system identification.

7. Method according to claim 1, wherein said description of uncertainty of fitted model parameters is determined through bootstrapping.

8. Method according to claim 1, wherein at least one fitted model parameter describes measurement uncertainty.

9. Method according to claim 1, wherein said model structure in addition to fitted model parameters depends on model parameters which are fixed.

10. Method according to claim 1, wherein said model structure is based on physical modeling, black-box modeling, or a combination thereof.

11. Method according to claim 1, wherein said historical production measurements include measurements of manipulated variables that influence routing valves, gas lift valves or production valves in the production system.

12. Method according to claim 1, wherein said model structure is used to determine the present production of individual wells.

13. Method according to claim 1 wherein said description of uncertainty is used to reduce or compensate for uncertainty in fitted model parameters.

14. Method according to claim 1, where the set of historical production measurements can describe normal operations, where some manipulated variables are changed little and where other manipulated variables are altered simultaneously.

15. Method according to claim 1, wherein said historical production measurements include measurements from a test separator.

16. Method according to claim 1, wherein said historical production measurements include measurements from a multiphase meter.

17. Method according to claim 1, wherein said historical production measurements include measurements of separated produced fluids from one or several wells, such as the total separated production of oil, gas or water.

18. Method according to claim 1, wherein a reference to at least one of prediction of produced fluids, quality tag or fitted model parameter, is presented to a user or an operator.

19. Method according to claim 1, wherein the fluid streams produced by the individual wells are commingled and routed via a fluid separation assembly.

20. Computer program loadable into the internal memory of a processing unit in a computer based system, comprising software code portions for performing one or more steps of claim 1, when said product is run on said system.

21. Computer program product stored on a computer readable medium, comprising a readable program for causing a processing unit in a computer based system, to control an execution of one or more steps of claim 1.

22. A system for oil and/or gas production comprising a plurality of oil and/or gas wells each producing a multiphase fluid stream, with means adapted for predicting change in produced fluids resulting from change in manipulated variables, characterized by computer implemented means for carrying out a method in which fitted model parameters which express the relationship between the change in manipulated variables and the produced fluids are determined from a set of historical production measurements, said method comprising the steps of
    a. choosing a model structure which predicts change in produced fluids as a function of the change in manipulated variables, where the predicted change in produced fluids depends on the value of fitted model parameters
    b. determining fitted model parameters so that predictions of produced fluids match said historical production measurements as closely as possible
    c. determining a quality tag that describes the uncertainty of said predictions of change in produced fluids.

23. A method in an oil and/or a gas production system comprising a plurality of oil and/or gas wells each producing a multiphase fluid stream, for increasing throughput and/or profit for said oil and/or gas wells, said method being adapted for predicting change in produced fluids resulting from change in manipulated variables, wherein fitted model parameters which express the relationship between the change in manipulated variables and the produced fluids are determined from a set of historical production measurements, said method comprising the steps of
    a. choosing a model structure which predicts change in produced fluids as a function of the change in manipulated variables, where the predicted change in produced fluids depends on the value of fitted model parameters
    b. determining fitted model parameters so that predictions of produced fluids match said historical production measurements as closely as possible
    c. determining a quality tag that describes the uncertainty of said predictions of change in produced fluids.

24. A method according to claim 23, wherein said predictions of change in one or more manipulated variables are determined by solving a numerical optimization problem.

25. A method according to claim 23, wherein said predictions of change in one or more manipulated variables is determined by using a formula of the type:

$$[\hat{u}(\hat{\theta})\hat{x}(\hat{\theta})] = \operatorname*{argmax}_{u,x} M(x, u, d)$$
$$\text{s.t } 0 = f(x, u, d, \hat{\theta})$$
$$0 \le c(x, u, d).$$

* * * * *